(12) United States Patent
Huang et al.

(10) Patent No.: US 10,349,075 B2
(45) Date of Patent: Jul. 9, 2019

(54) METHOD AND DEVICE FOR LOSSLESS COMPRESSION OF VIDEO DATA

(71) Applicants: MONTAGE LZ SEMICONDUCTOR (SHANGHAI) CO., LTD., Shanghai (CN); MONTAGE LZ TECHNOLOGIES (CHENGDU) CO., LTD., Shuangliu District, Chengdu OT (CN)

(72) Inventors: Youyuan Huang, Shanghai (CN); Zhimin Qiu, Shanghai (CN)

(73) Assignees: MONTAGE LZ SEMICONDUCTOR (SHANGHAI) CO., LTD., Shanghai (CN); MONTAGE LZ TECHNOLOGIES (CHENGDU) CO., LTD., Shuangliu District, Chengdu OT (CN)

( * ) Notice: Subject to any disclaimer, the term of this patent is extended or adjusted under 35 U.S.C. 154(b) by 150 days.

(21) Appl. No.: 15/635,173

(22) Filed: Jun. 27, 2017

(65) Prior Publication Data
US 2018/0213247 A1    Jul. 26, 2018

(30) Foreign Application Priority Data
Jan. 22, 2017   (CN) .......................... 2017 1 0047472

(51) Int. Cl.
*H04N 19/91*    (2014.01)
*H04N 19/503*   (2014.01)
(Continued)

(52) U.S. Cl.
CPC ........... *H04N 19/503* (2014.11); *H04N 19/11* (2014.11); *H04N 19/13* (2014.11); *H04N 19/134* (2014.11);
(Continued)

(58) Field of Classification Search
None
See application file for complete search history.

(56) References Cited

U.S. PATENT DOCUMENTS 6,654,503 B1 * 11/2003 Sudharsanan ........ H04N 19/105
                                                              348/411.1
9,930,362 B2 *  3/2018 Gao ..................... H04N 19/176
(Continued)

*Primary Examiner* — Jayanti K Patel
*Assistant Examiner* — Shadan E Haghani
(74) *Attorney, Agent, or Firm* — Jun He Law Offices P.C.; James J. Zhu

(57) ABSTRACT

A method for lossless compression of video data is provided. The method includes: receiving video data including a plurality of video frames; dividing each of the plurality of video frames into a plurality of compression regions, wherein each compression region includes at least one compression unit; processing each compression region of a first video frame by: providing a prediction mode parameter set including a plurality of prediction modes; performing prediction processing on at least a part of the compression units using the prediction modes, and determining usage of the prediction modes; and selecting at least a part of the prediction modes as a preferred prediction mode parameter set based on the usage; performing prediction processing on subsequent video frames using the determined preferred prediction parameter mode set to obtain coding blocks; and performing entropy coding processing on the coding blocks to obtain compressed video data.

21 Claims, 5 Drawing Sheets

(51) Int. Cl.
*H04N 19/176* (2014.01)
*H04N 19/172* (2014.01)
*H04N 19/196* (2014.01)
*H04N 19/13* (2014.01)
*H04N 19/134* (2014.01)
*H04N 19/11* (2014.01)
*H04N 19/157* (2014.01)

(52) U.S. Cl.
CPC ......... *H04N 19/157* (2014.11); *H04N 19/172* (2014.11); *H04N 19/176* (2014.11); *H04N 19/196* (2014.11); *H04N 19/91* (2014.11)

(56) References Cited

U.S. PATENT DOCUMENTS

| | | | |
|---|---|---|---|
| 2004/0114817 A1* | 6/2004 | Jayant | H04N 19/00 |
| | | | 382/239 |
| 2010/0232722 A1* | 9/2010 | Park | H03M 7/40 |
| | | | 382/239 |
| 2011/0317757 A1* | 12/2011 | Coban | H04N 19/197 |
| | | | 375/240.02 |
| 2016/0366416 A1* | 12/2016 | Liu | H04N 19/52 |
| 2017/0201764 A1* | 7/2017 | Kim | H04N 19/124 |

* cited by examiner

METHOD AND DEVICE FOR LOSSLESS COMPRESSION OF VIDEO DATA

CROSS REFERENCE TO RELATED APPLICATIONS

This application claims priority to Chinese Patent Application Number 201710047472.6 filed on Jan. 22, 2017, the entire content of which is incorporated herein by reference.

TECHNICAL FIELD

The disclosure generally relates to the field of video image processing, and more particularly to a method and device for lossless compression of video data.

BACKGROUND

With the popularity of ultra-high resolution video images in the market, video and image codecs causes an increasing bandwidth burden to an external memory, and a large amount of data exchanges with the external memory also increases chip power consumption. Video data compression is a way to solve the problem of bandwidth burden. Frame compression methods generally include three types: lossy compression, lossless compression and hybrid compression consisting of lossy and lossless compression. Lossy compression generally adopts a method of quantizing compressed data. Lossless frame compression is usually composed of two stages: prediction and entropy coding. The processing method of the first stage generally includes two types, one is prediction processing, e.g. spatial prediction, which is utilized to get a difference between data to be compressed and a predicted value, and then the second stage of processing will be performed; and the other is transform processing, which is utilized to transform the data to the frequency domain, and then the second stage of processing will be performed. The processing method of the second stage is usually entropy coding processing, in which variable length codes are typically used to encode, so as to achieve data compression.

Lossy compression typically achieves an increase in compression ratio at the expense of loss of video quality, which degrades the quality of a current video frame. If the current video frame is used as a reference video frame for subsequent video frames in a video codec, a quality loss of the current video frame will be propagated in the subsequent video frames, thereby decreasing the quality of the video sequence. Currently, the conventional lossless compression methods either have a low overall compression ratio, or have a high computational complexity.

Therefore, it is desirable to improve the existing methods of video data compression.

SUMMARY

A method and device for lossless compression of video data is provided in embodiments of the present disclosure. In some embodiments, the method and device could reduce the bandwidth requirements of video and image codecs to external memories, and have a high data compression ratio and data throughput.

In one aspect of the present application, a method for lossless compression of video data is provided, including: A) receiving video data including a plurality of video frames; B) dividing each of the plurality of video frames into a plurality of compression regions, wherein each compression region includes at least one compression unit, and each compression unit includes a pixel array; C) processing each compression region of a first video frame in the plurality of video frames by: C1) providing a prediction mode parameter set including a plurality of prediction modes; C2) performing prediction processing on at least a part of the compression units included in the compression region using the plurality of prediction modes included in the prediction mode parameter set, and determining usage of the plurality of prediction modes during the prediction processing of the compression region; and C3) selecting at least a part of the prediction modes from the prediction mode parameter set as a preferred prediction mode parameter set of the compression region, based on the usage of the plurality of prediction modes during the prediction processing of the compression region; D) performing prediction processing on subsequent video frames after the first video frame in the plurality of video frames using the determined preferred prediction parameter mode set, so as to obtain coding blocks corresponding to each compression unit included in the subsequent video frames; and E) performing entropy coding processing on the coding blocks, so as to obtain compressed video data.

In another aspect of the present application, a device for lossless compression of video data is also provided, the device being used for compressing video data including a plurality of video frames, wherein each of the plurality of video frames is divided into a plurality of compression regions, each compression region including at least one compression unit, and each compression unit includes a pixel array. The device includes: a compression mode parameter set configured to provide a prediction mode parameter set, wherein the prediction mode parameter set includes a plurality of prediction modes for performing two-dimensional spatial prediction processing on the video data; a two-dimensional spatial prediction module configured to perform the two-dimensional spatial prediction processing on at least a part of the compression units included in each compression region of the first video frame of the plurality of video frames using the plurality of prediction modes included in the prediction mode parameter set, and generate corresponding coding blocks; a compression cost computation module configured to receive, from the two-dimensional spatial prediction module, the prediction mode used for prediction processing of each compression unit of the first video frame and the corresponding coding blocks, and determine an optimum prediction mode of each compression unit; a statistics module configured to receive, from the compression cost computation module, the optimum prediction mode used for prediction processing of the compression units included in the first video frame, and generate a statistical result of the optimum prediction mode; an adaptive mode parameter set selection module configured to select at least a part of the prediction modes from the prediction mode parameter set as a preferred prediction mode parameter set of each compression region based on the statistical result of the optimum prediction mode, and analyze whether the preferred prediction mode parameter set is applicable to prediction processing of subsequent video frames in the current video sequence after the preferred prediction mode parameter set has been selected; wherein the two-dimensional spatial prediction module is further configured to perform the two-dimensional prediction processing on the subsequent video frames after the first video frame in the plurality of video frames using the selected preferred prediction mode parameter set, so as to obtain coding blocks corresponding to each compression unit included in the subsequent video frames; and wherein the device further includes an entropy coding module configured to perform entropy coding processing on the coding blocks, so as to obtain compressed video data.

The foregoing is an overview of the present application, which may simplify, summarize, and omit details. Those skilled in the art will appreciate that this section is merely illustrative and not intended to limit the scope of the present application in any way. This summary section is neither intended to identify key features or essential features of the claimed subject matter nor intended to act as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limiting the scope of the present application. The contents of the present application will be illustrated more clearly and in more detail with the accompanying drawings.

DETAILED DESCRIPTION OF THE EMBODIMENTS

Figures 1, 2:
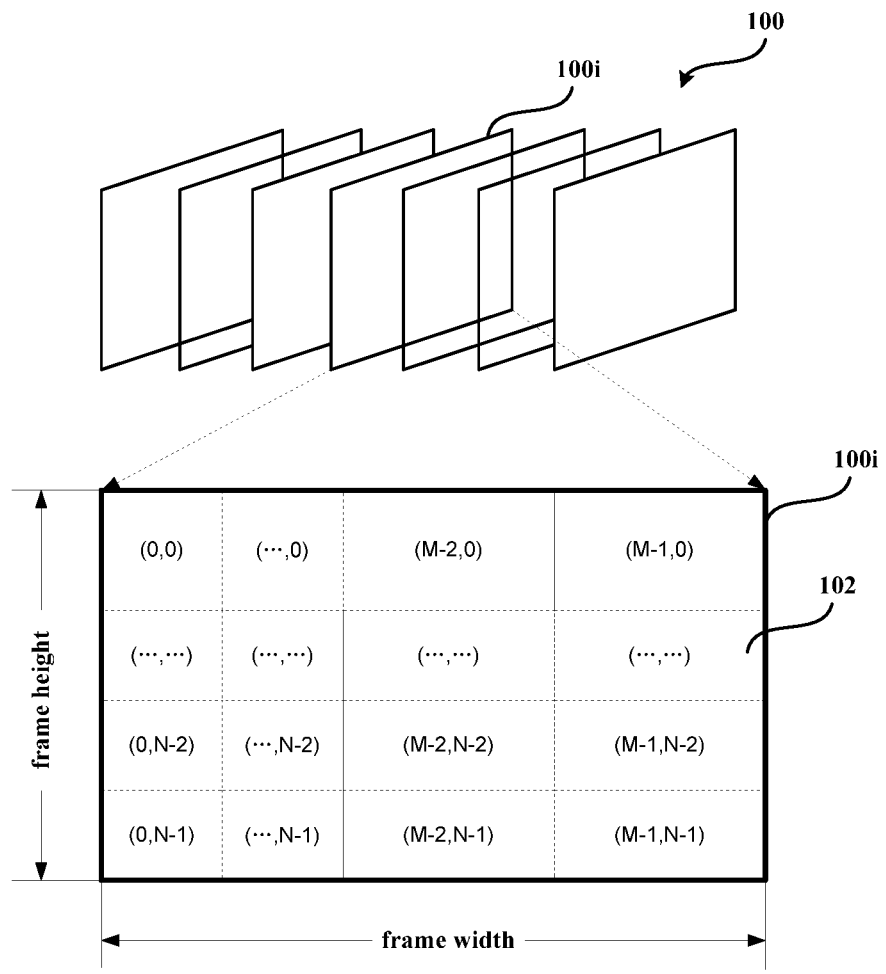
FIG. 1 illustrates an exemplary structure of video data according to an embodiment of the present application.
FIG. 2 illustrates an example of a compression unit.

In the following detailed description, reference is made to the accompanying drawings which form a part hereof. In the drawings, similar reference numerals generally refer to similar parts unless the context clearly dictates otherwise. The illustrative embodiments described in the detailed description, drawings and claims are not intended to be limiting. Other embodiments may be employed and other changes may be made without departing from the spirit or scope of the subject matter of the present application. It is to be understood that various configurations, substitutions, combinations and designs of the various forms of the present application, which are generally described in this application and are illustrated in the drawings, are intended to constitute a part of the present application.

FIG. 1 illustrates an exemplary structure of video data 100 according to an embodiment of the present application.

As shown in FIG. 1, the video data 100 includes a video sequence composed of a plurality of video frames, each of which has a same height and width. Each video frame in the video data 100 is divided into a plurality of compression regions before compression processing of the video data 100. For example, a video frame 100i is divided into an array of M×N compression regions 102 as shown in FIG. 1, wherein the array has M columns and N rows of compression regions 102 (M, N are positive integers greater than or equal to 1). Since video frames temporally adjacent or close to each other in a video sequence usually display same or similar image contents, compression regions of these video frames also have same or similar image contents at a same position (e.g., column 0, row N−2 of the M×N array). After the video frame is divided, same or similar kinds of compression processing may be performed on the compression regions at the same position, so that compression efficiency can be improved. On the contrary, different kinds of compression processing may be performed on compression regions at different positions according to the image contents thereof. For example, different sets of prediction mode parameter are used in spatial prediction processing, so that the compression ratio of video data can be further improved.

When dividing a video frame into regions, the video frame is usually divided into compression units, wherein each compression unit typically includes a pixel array. FIG. 2 shows an example of a compression unit, wherein the compression unit includes 16 columns and 4 rows, i.e., a total of 64 pixels. Each compression region 102 typically includes one or more compression units, depending on the arrangement and the number of compression regions at the time of dividing the image.

Figure 3:
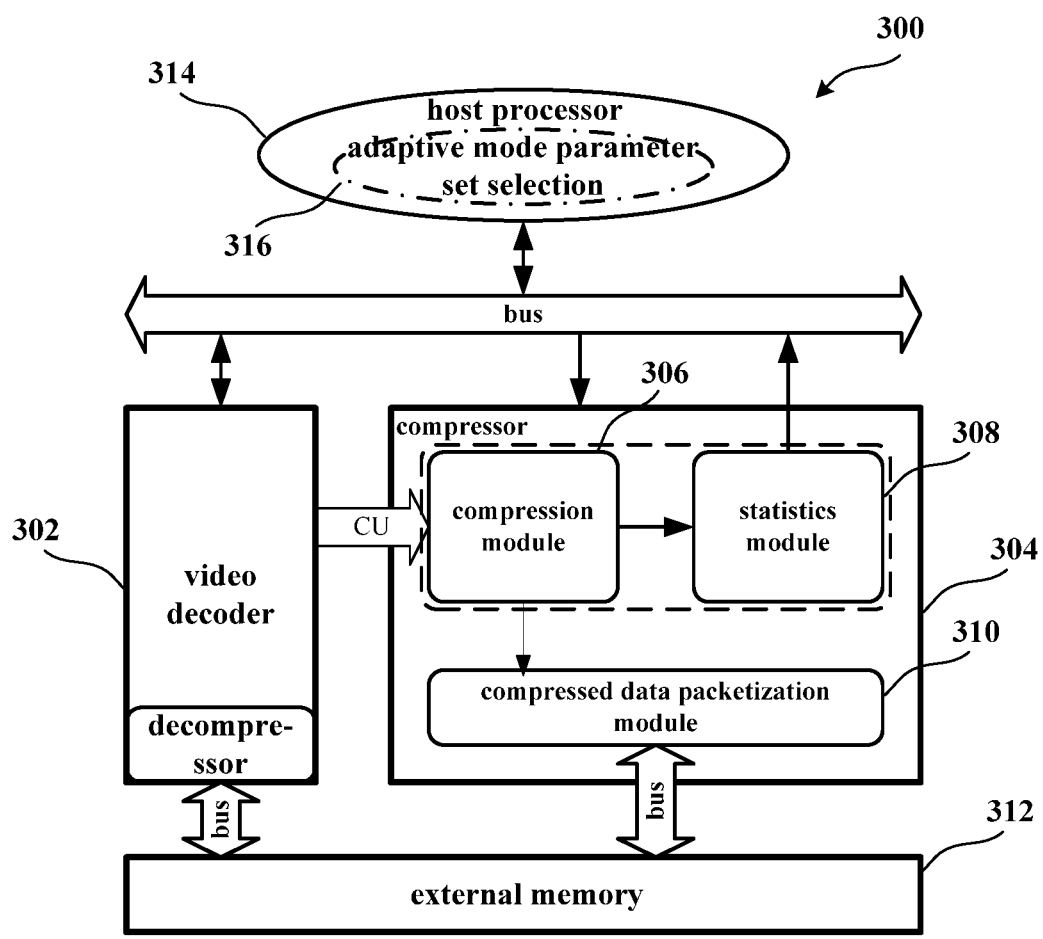
FIG. 3 illustrates a video processing system 300 according to an embodiment of the present application.

FIG. 3 shows a video processing system 300 according to an embodiment of the present application. The video processing system 300 may process video data such as those shown in FIGS. 1 and 2.

Specifically, as shown in FIG. 3, the video processing system 300 includes a video decoder 302 in which video data is decoded to obtain reconstructed video data. The reconstructed video data employs a specific video format, such as the YUV format. It is to be understood that, the method and device of the present application may also be used in compression processing of a video encoder to reconstruct frame data in a similar manner. Thus, the decoder is described only as an example herein.

As shown in FIGS. 1 and 2, the reconstructed video data includes a plurality of video frames, wherein each video frame is divided into a plurality of compression regions, and each compression region includes a plurality of compression units (CU). In some embodiments, an image dividing module (not shown) for dividing the video data may be provided between the video decoder 302 and a compressor 304. In some embodiments, the image dividing module may be integrated in the video decoder 302 or the compressor 304. After the dividing processing, the reconstructed video data is sent to the compressor 304 for the compressor 304 to compress the video data.

The compressor 304 includes a compression module 306, a statistics module 308, and a compressed data packetization module 310. The compression module 306 is configured to compress the received compression units according to a predetermined compression algorithm. In some embodiments, the compression module 306 may use a prediction processing algorithm and an entropy coding processing algorithm conjunctively, in order to process the compression units. During processing, both of these two algorithms need to obtain parameters of the algorithms from a corresponding adaptive mode parameter set selection module 316, and process the compression units based on the acquired mode parameters. In some embodiments, the adaptive mode parameter set selection module 316, which may be used by the prediction processing algorithm and the entropy coding process algorithm respectively, is disposed in a host processor 314, as shown in FIG. 3. In other embodiments, the mode parameter set may also be disposed in other modules, for example, in the compression module 306.

In some embodiments, the adaptive mode parameter set selection module 316 may have compression mode parameter sets, each of which includes a plurality of mode parameters, which may be used for processing a certain compression unit. In this case, the compression module 306 may traverse all available mode parameters and determine a compression ratio corresponding to each mode parameter when used to compress one or more compression units. Based on computation results of these compression ratios, the compression module 306 may determine a mode parameter having an optimum compression ratio as an optimum mode parameter used at the time of compressing the corresponding compression unit, and compress the compression unit with the optimum mode parameter.

The optimum mode parameter, determined by the compression module 306 and used by each compression unit, is provided to the statistics module 308. The statistics module 308 may further perform statistical computations on these optimum mode parameters, such as computing the frequency, occupancy, or similar statistical results for each mode parameter being determined as the optimum mode parameter. The statistics module 308 may provide the statistical result generated by itself to the host processor 314 via a bus, and then the adaptive mode parameter set selection module 316 is modified or set by the host processor 314. For example, if some of the mode parameters are never or rarely used, the host processor 314 may set these mode parameters of the adaptive mode parameter set selection module 316 to be disabled. As such, when the compression module 306 traverses the compression mode parameter sets of the adaptive mode parameter set selection module 316 to select an optimum mode parameter for a compression unit of subsequent video frames, these disabled mode parameters may not be used, thereby reducing the number of computations and improving the efficiency of compression processing. In some embodiments, a prediction mode, whose frequency of being determined as the optimum prediction mode exceeds a predetermined threshold or whose proportion of being determined as the optimum prediction mode exceeds a predetermined percentage, may be selected from the prediction mode parameter set and determined as a preferred prediction mode parameter set for a compression region.

In practice, the modification and setting of the adaptive mode parameter set selection module 316 is particularly applicable to the processing of a video data sequence. Since a plurality of video frames included in a video data sequence are generally interrelated in content, compression processing mode of a previous video frame is also generally applicable to compression processing of subsequent video frames in the sequence. For example, a part of the mode parameters with a higher usage frequency (i.e., a greater suitability) may be determined based on results of compression processing of respective compression units in the first video frame in the video data sequence, and only this part of the mode parameters are used for compression processing of subsequent video frames. Accordingly, after the preferred prediction mode parameter set has been selected, the adaptive mode parameter set selection module 316 may analyze whether the preferred prediction mode parameter set is suitable for prediction processing of subsequent video frames in the current video sequence. If it is not suitable for processing, the adaptive mode parameter set selection module 316 may re-determine a preferred prediction mode parameter set.

It will be appreciated that the compressor 304 may remodify and reset the above mode parameter set to determine a new suitable mode parameter set for processing other video data, when the compression processing of the video data sequence ends or, similarly, the contents of the video data change significantly. It is to be noted, however, the method and device of the present application may also be used for processing a plurality of video frames belonging to different video data sequences, as long as contents of these different video data sequences are similar. For example, these video data sequences may be generated by a video capture device that monitors a static object or background environment.

After compression processing, the compression module 306 provides the compressed video data to the compressed data packetization module 310, and the compressed data packetization module 310 performed data packetization. Then, the packetized compressed video data may be further provided to an external memory 312.

Figure 4:
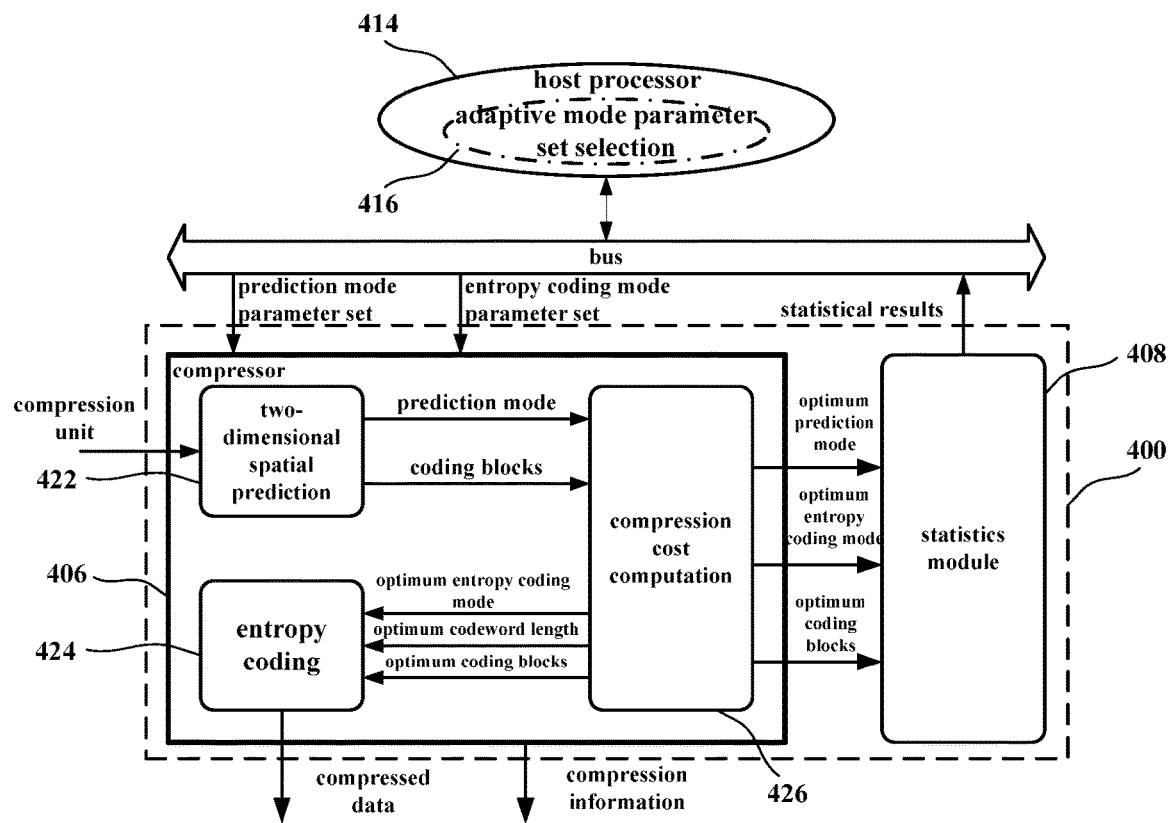
FIG. 4 illustrates a block diagram of a compressor 400 according to an embodiment of the present application.

FIG. 4 shows a block diagram of a compressor 400 according to an embodiment of the present application. The compressor 400 is an example of the compressor 304 in the video processing system 300 shown in FIG. 3. The compressor 400 may be used for compressing the video data shown in FIGS. 1 and 2.

As shown in FIG. 4, the compressor 400 includes a compression module 406 and a statistics module 408. In some embodiments, the compressor 400 may further include a data packetization module (not shown).

Specifically, the compression module 406 is used for compressing video data, and may include a two-dimensional spatial prediction module 422, an entropy coding module 424, and a compression cost computation module 426.

Specifically, the two-dimensional spatial prediction module 422 is configured to receive compression units to be compressed in reconstructed video frames, and perform two-dimensional spatial prediction processing on the compression units. The two-dimensional spatial prediction processing predicts values of un-encoded pixels using values of encoded (compression encoded) pixels as reference values, and usually the predicted values of the pixels are close to the original values of the pixels in size, so that data compression can be realized by such processing. For example, a differential pulse code modulation (DPCM) algorithm can be used for two-dimensional spatial prediction processing.

Before performing a two-dimensional spatial prediction processing on a compression unit, it is necessary to determine an order by which the compression unit is scanned, so as to obtain all the pixels sequentially from the pixel array of the compression unit. Referring to FIG. 2, all the pixels in the pixel array of the compression unit are scanned in accordance with a scanning order from the 0th pixel to the 63rd pixel (i.e., scanning in columns, and from left to right between different columns), and these pixels are processed in the scanning order. It will be appreciated, in some embodiments, a compression unit may also be scanned in rows, and from top to bottom between different rows. Preferably, the scanning order may correspond to the larger one of column number and row number of the pixel array of the compression unit. For example, the pixel array shown in FIG. 2 has 16 columns and 4 rows, and thus its scanning order corresponds to the column. This is because this type of scanning can reduce the number of starting row (column) pixels. The starting row (column) pixels include pixels of the scanned starting row of the pixel array (scanned in rows), or include pixels of the scanned starting column of the pixel array (scanned in columns). For the pixel array shown in FIG. 2, if it is scanned in rows, it includes 16 starting row pixels, each of which can only refer to one pixel on its left side (except for the 0th pixel) when being processed with the two-dimensional spatial prediction; and if it is scanned in columns, it includes 4 starting column pixels, each of which can only refer to one pixel on its upper side (except the 0th pixel) when being processed with the two-dimensional spatial prediction, and the other 60 pixels may refer to at least 2 pixels. Therefore, it is preferable to process the compression unit shown in FIG. 2 in a manner of scanning in columns.

Depending on the relative position between the encoded pixel selected as the reference value and the pixel being processed, the two-dimensional spatial prediction processing may use different prediction modes. In some examples, the prediction mode only refers to one adjacent pixel in one direction. In other examples, the prediction mode may refer to a plurality of adjacent pixels in a plurality of directions. The selection of the selectable prediction modes generally depends on a position of each pixel in the pixel array of the compression unit.

Specifically, referring to FIG. 2, the predicted value of each pixel in the 0th group of pixels located in the first column on the left side of the compression unit (except for the 0th pixel served as the starting pixel) may only refer to the value of the adjacent pixel on the upper side, and this is because pixel values of other adjacent positions haven't been generated or are temporarily absent. For example, the predicted value of the 2nd pixel may only refer to the value of the 1st pixel, so that the prediction mode thereof may be represented as referring to the upper adjacent pixel.

However, for each pixel in the 1st group of pixels located in the first row of the compression unit (excluding the 0th pixel that has been grouped into the 0th group), the predicted value thereof may refer to the left and lower left adjacent pixels. For example, for the 4th pixel, since the predicted value of the other pixels (the 5th, 8th, and 9th pixels) closely adjacent thereto are not yet generated, the predicted value thereof may refer to one or both of the values of the left adjacent pixel (the 0th pixel) and/or the lower left pixel (the 1st pixel). In addition, for the pixels in the second group of pixels in the compression unit that are not in the above positions, the predicted value of each pixel may refer to one or more of the upper left adjacent pixel, the left adjacent pixel, the lower left adjacent pixel and/or the upper adjacent pixel, for example refer to the upper left adjacent pixel or refer to the upper left adjacent pixel and the left adjacent pixel.

In some embodiments, the 0th and 1st groups of pixels are at starting edge positions of the pixel array of the compression unit, and, therefore, are referred to as the starting edge pixels. The 2nd group of pixels is at non-starting edge positions, and, therefore, are referred to as non-starting edge pixels. It is to be noted that, for the 2nd group of pixels, though part of the pixels are at edge positions, such as the 7th, 11th, 15th, 19th, 23rd, 27th, 31st, 35th, 39th, 43rd, 47th, 51st, 55th, 59th, 61st, 62nd, and 63rd pixels, these pixels are not the starting pixels of the columns thereof, and thus they do not belong to the starting edge pixels.

For each pixel, after the two-dimensional spatial prediction processing, its corresponding prediction unit (PU) will be obtained, and then its corresponding coding blocks (CB) will be obtained as well. For example, for the compression unit shown in FIG. 2, the coding value CB[0] of the 0th pixel is the same as its original pixel value CU[0] because it is not predicted; and the coding value of the other pixels is CB[i]=CU[i]−PU[i], where i is a positive integer ranging from 1 to 63. CU[i] is the original pixel value of the ith pixel, and PU[i] is the predicted value of the pixel, which depends on the predicted values of one or more pixels referred to in the corresponding prediction mode. In other words, the coding value of the coding blocks obtained after prediction processing of the compression unit is a difference between the pixel value and the predicted value.

The two-dimensional spatial prediction module 422 may traverse all the prediction modes in the prediction mode parameter set, and send the prediction modes it used and the coding blocks obtained by the prediction processing to the compression cost computation module 426. In this way, the compression cost computation module 426 can compare compression ratios of the current compression unit when using different prediction modes, so as to determine the optimum prediction mode and/or the preferred prediction mode. In some preferred embodiments, the compression cost computation module 426 may determine the optimum prediction mode by comparison, and send the optimum prediction mode to the statistics module 408 along with the corresponding optimum coding blocks.

Spatial prediction processing of each compression unit has an optimum prediction mode, or one or more preferred prediction modes. In some embodiments, the prediction mode with the highest compression ratio is determined as the optimum prediction mode, and a prediction mode with relatively high compression ratio (for example, a prediction mode with a compression ratio higher than a predetermined ratio) is determined as the preferred prediction mode. Each prediction mode may be based on a prediction reference direction or a combination of a plurality of prediction reference directions. It will be appreciated that the selectable prediction reference directions for starting edge pixels are limited. For example, for the 0th group of pixels, since the predicted values can only refer to the upper adjacent pixels, the predicted values of the group of pixels can be set in advance as referring to the upper adjacent pixels.

Since there is generally a correlation between the contents of one or more adjacent video frames in the video data, a preferred prediction mode parameter set corresponding to a compression region at a certain position of the current video frame can be used for spatial prediction processing of a compression region at a corresponding position of subsequent video frames. The subsequent video frames may be in the same video data sequence as the current video frame.

For example, for a compression region (M−2, N−2) of the video frame 100*i* shown in FIG. 1, if it is determined the preferred prediction mode parameter set of the compression region includes three preferred prediction modes, i.e., referring to the left adjacent pixel, referring to the upper adjacent pixel and referring to the upper left and lower left pixels, the prediction processing of the compression units of the compression region at the same position of the subsequent video frames only needs to select an optimum prediction mode from the three preferred prediction modes, and it is not necessary to use the modes such as referring to the upper left adjacent pixel or referring to the lower left adjacent pixel. It greatly improves the efficiency of compression processing, and achieves the adaptive prediction mode selection and configuration.

In some embodiments, the statistics module 408 may make statistics on the optimum prediction mode of the compression unit in the compression region. For example, in the video data shown in FIG. 1, overall statistics can be made on the optimum prediction mode of the pixels in all of the compression units in the compression region (0, 0), and similar statistics can be made on the optimum prediction mode of other compression regions (e.g., compression regions (0, N−1), (M−1, N−1), etc.). The reason for such processing is that different compression units in a compression region usually have some correlation in contents, and the manners in which the spatial predictions are processed are substantially similar. Thus, all compression units in the same compression region can share a preferred prediction mode parameter set, which can reduce the number of preferred prediction mode parameter sets and reduce the complexity of implementation. In addition, since the preferred prediction mode parameter set corresponding to the same compression region is determined by combining the prediction processing results of all of the compression units therein, the larger number of statistical samples reduces the uncertainty of the preferred prediction mode parameter set. Similarly, the preferred prediction mode parameter set determined by the spatial prediction processing of a compression region of a current video frame may be used in spatial prediction processing of corresponding compression regions of the subsequent video frames. It should be noted that, in some embodiments, the prediction processing may be performed on all of the compression units in a compression region, and statistics can be made on the adopted optimum prediction mode. In other embodiments, the prediction processing may be performed on part of the compression units of the compression region, and statistics can be made on the adopted optimum prediction mode.

Specifically, the statistics module 408 may make statistics to obtain a statistical distribution of usage frequencies of all prediction modes in the current prediction mode parameter set of all compression regions of the current video frame, and a distribution of each coding value in coding blocks corresponding to each compression unit.

In some embodiments, the compression module 406 may periodically perform a determining operation of the preferred prediction mode parameter set, so as to prevent part of the prediction modes in the original preferred prediction mode parameter set from being unsuitable for processing of the latest video frame due to significant changes in the video frame content. In other embodiments, the compression module 406 may select and determine a suitable preferred prediction mode parameter set for each video data sequence, since different video sequences may require different preferred prediction mode parameter set.

The statistics module 408 may provide statistical results, such as the statistical distribution of the usage frequencies of the prediction modes and the statistical distribution of each coding value in the coding blocks, to the adaptive mode parameter set selection module 416 in the host processor 414, so that the adaptive mode parameter set selection module 416 selects a part of the prediction modes as preferred prediction mode parameter set. As such, when the compression module 406 compresses subsequent video frames, the modes of preferred prediction mode parameter set being set in the adaptive mode parameter set selection module 416 may be called.

As described above, the two-dimensional spatial prediction module 422 generates coding blocks corresponding to the prediction mode. Then the entropy coding module 424 performs entropy coding processing on these coding blocks, respectively, to obtain compressed video data. The entropy coding processing performed by the entropy coding module 424 may also employ different entropy coding modes, which may constitute entropy coding mode parameter set and be stored in the adaptive mode parameter set selection module 416 so as to be called by the entropy coding module 424 or other modules.

Similar to the two-dimensional spatial prediction processing, different entropy coding modes selected in entropy coding processing may also affect the compression ratio of the video data. In some preferred embodiments of the present application, the compression cost computation module 426 may also traverse a plurality of entropy coding modes included in the entropy coding mode parameter set, so as to determine which entropy coding mode is most suitable for processing the coding blocks corresponding to the current compression unit. These entropy coding modes may be obtained from the adaptive mode parameter set selection module 416. In some embodiments, the entropy coding module may receive the optimum coding blocks (i.e., the coding blocks obtained by prediction processing with the optimum prediction mode), and perform entropy coding process on the optimum coding blocks.

Figure 5:
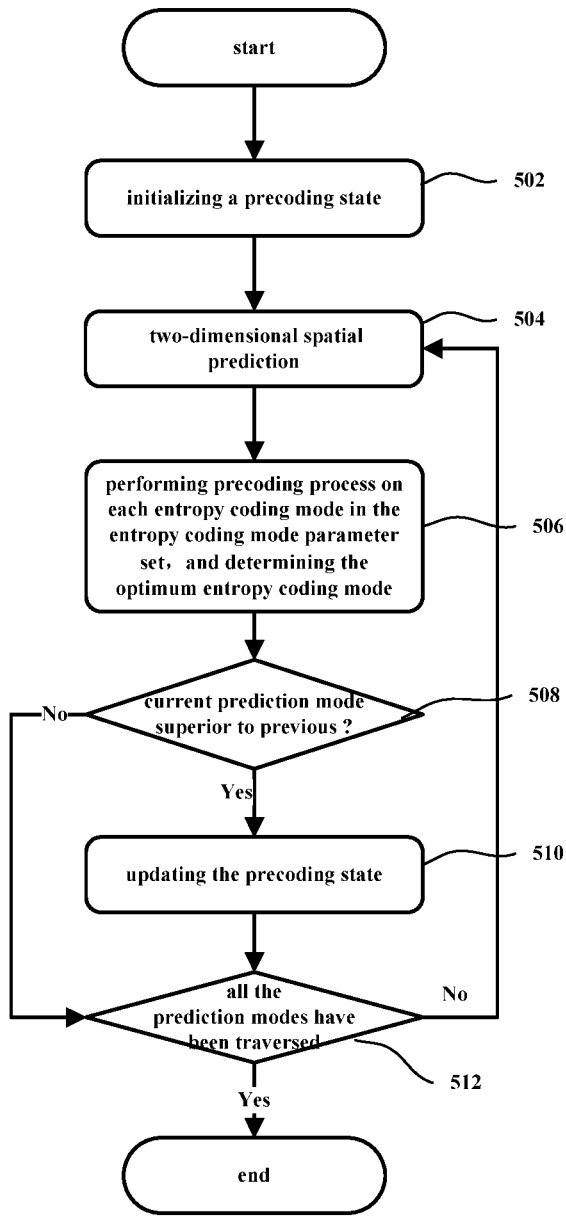
FIG. 5 illustrates a flow diagram of computing and deciding compression cost by a compression cost computation unit.

FIG. 5 shows a flow chart of computing and deciding the compression cost by the compression cost computation unit 426. In this process flow, the prediction mode and the entropy coding mode are considered together. It will be appreciated that in some other embodiments, only the selection of the prediction mode may be considered without considering the entropy coding mode.

As shown in FIG. 5, in step 502, the compression cost computation unit initializes a precoding state. The precoding means that each entropy coding mode in the entropy coding parameter set is needed to perform precoding during the cost computation process, so as to obtain the compression cost for coding the coding blocks CB of the current compression unit CU, where it is not necessary to obtain a complete codeword. Thus, in some embodiments, the entropy coding module may be implemented in the compression cost computation module. In other embodiments, for example, in the embodiment shown in FIG. 4, the entropy coding module 424 is implemented outside the compression cost computation module 426. In some embodiments, initialization of the precoding state may set the initial value of the compression cost, for example, set the compression ratio to 1 (i.e., uncompressed).

Next, in step 504, the result of the two-dimensional spatial prediction processing is obtained, i.e. the coding blocks obtained after the compression unit are processed. Thereafter, in step 506, for the result of the two-dimensional spatial prediction processing using a certain prediction mode, precoding processing is performed on the coding blocks with each entropy coding mode in the entropy coding mode parameter set, and the results of the precoding processing are compared to determine the optimum entropy coding mode. Thereafter, in step 508, the optimum entropy coding result corresponding to the current prediction mode is compared with the optimum entropy coding result corresponding to the previous prediction mode. The precoding state is updated with the optimum entropy coding result corresponding to the current prediction mode if it is superior to the optimum entropy coding result corresponding to the previous prediction mode, as shown in step 510. For example, the precoding state is updated, if the optimum entropy coding result corresponding to the current prediction mode is a compression ratio less than 1. Otherwise, the precoding state is not updated if the optimum entropy coding result corresponding to the current prediction mode is inferior to the one corresponding to the previous prediction mode, and the flow proceeds to step 512 to see if all the prediction modes have been traversed. The flow proceeds to step 504 if not all of the prediction modes have been traversed, and the two-dimensional spatial prediction and subsequent processing is performed with a prediction mode that has not been traversed until all prediction modes are traversed. If all the prediction modes have been traversed, the optimum prediction mode and the optimum entropy coding mode determined in the precoding state are output. In some embodiments, the optimum coding length and the optimum coding blocks corresponding to the optimum entropy coding mode are also output together, and are provided to the entropy coding module for subsequent processing. After that, the process ends.

Returning to FIG. 4, after determining the optimum entropy coding mode, the entropy coding module 424 receives information provided by the compression cost computation module 426, such as the optimum entropy coding mode, the optimum codeword length, the optimum coding blocks, etc., and entropy coding processing is performed on the optimum coding blocks to obtain compressed data of the current compression unit. The compressed data may be packetized by the compressed data packetization module, and then output from the video processing system.

In addition to the compression of data, the compression module 406 also outputs compression information of the current compression unit to the compressed data packetization module. The compression information includes information such as the position of the current compression unit in the currently compressing video frame, the data amount of the compressed data of the current compression unit, and the like.

On the other hand, similar to the determination of the preferred prediction mode parameter set, the statistics module 408 may also receive the optimum entropy coding mode employed by each compression unit of each compression region of video frames, and make statistics on these optimum entropy coding modes to determine a preferred entropy coding mode parameter set for a certain compression region of the video frame. The preferred entropy coding mode parameter set may include, for example, an entropy coding mode whose frequency of being determined as the optimum entropy coding mode exceeds a predetermined threshold or whose proportion of being determined as the optimum entropy coding mode exceeds a predetermined percentage. The preferred entropy coding mode parameter set may also be used for the entropy coding processing of the compression region of the corresponding position of subsequent video frames. For example, for a compression unit included in a compression region in subsequent video frames, the entropy coding module can only select one entropy coding mode from the preferred entropy coding mode parameter set to further process the coding blocks corresponding to the compression unit.

It can be seen that the device for lossless compression of video data in the present application is capable of performing adaptive compression processing in accordance with the contents of the video data. Such adaptive compression processing may select the appropriate compression mode parameter set and compression mode (where the compression mode includes the prediction mode and/or the entropy processing mode), and selectively disable the compression modes with low frequency of use. A higher compression rate is achieved and the data throughput is improved, without the loss of image quality.

Figure 6:
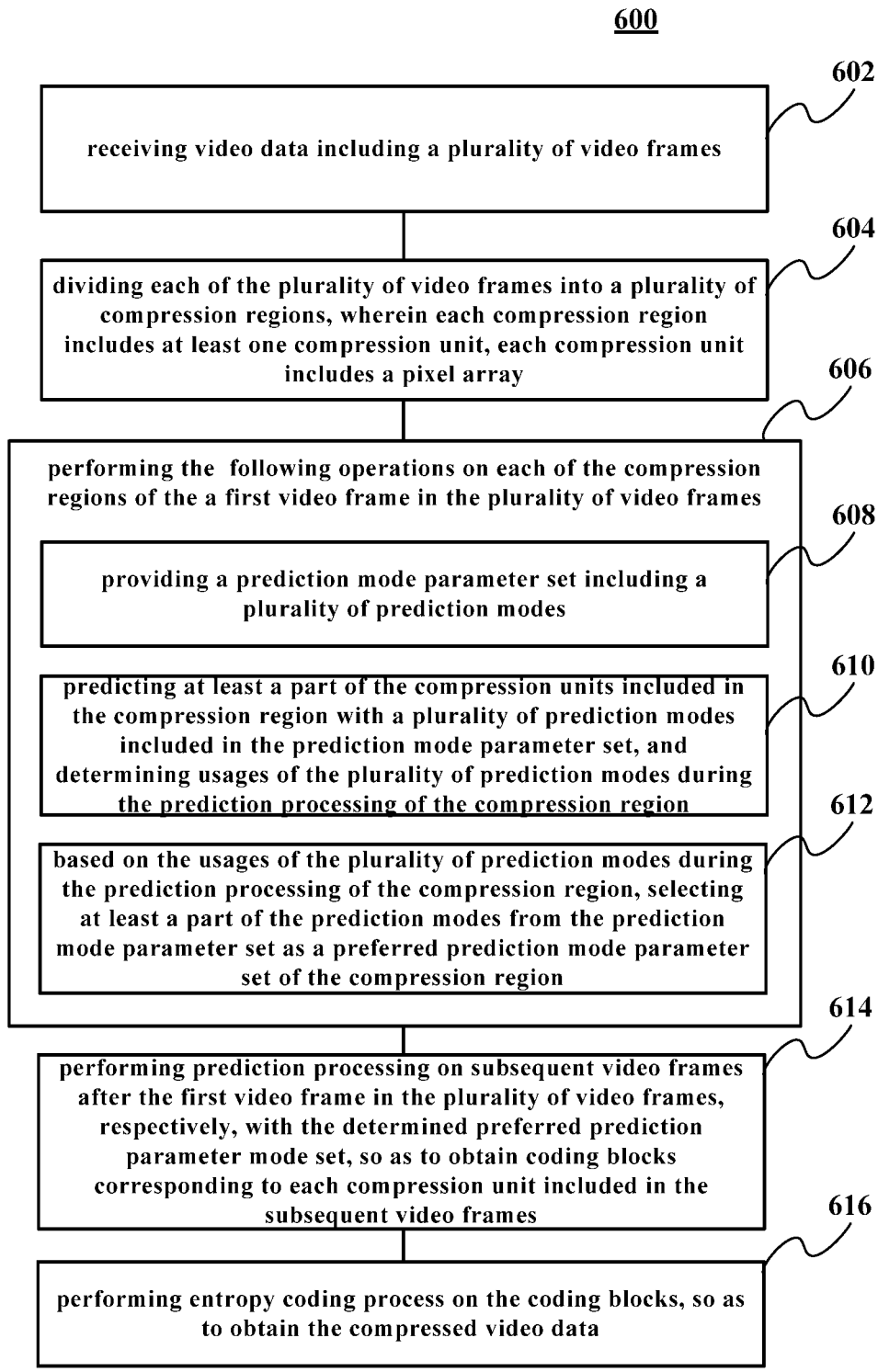
FIG. 6 illustrates a method for lossless compression of video data according to an embodiment of the present application.

FIG. 6 illustrates a method 600 for lossless compression of video data according to an embodiment of the present application. The method 600 may be implemented by the device shown in FIGS. 3 and 4.

As shown in FIG. 6, the method 600 starts in step 602, where video data including a plurality of video frames is received. In step 604, each of the plurality of video frames is divided into a plurality of compression regions, wherein each compression region includes at least one compression unit, and each compression unit includes a pixel array. In step 606, the following operations of steps 608-612 are performed on each of the compression regions of a first video frame in the plurality of video frames respectively. In step 608, a prediction mode parameter set including a plurality of prediction modes is provided. In step 610, at least a part of the compression units included in the compression region are predicted with a plurality of prediction modes included in the prediction mode parameter set, and usage of the plurality of prediction modes during the prediction processing of the compression region is determined. In step 612, based on the usage of the plurality of prediction modes during the prediction processing of the compression region, at least a part of the prediction modes are selected from the prediction mode parameter set as a preferred prediction mode parameter set of the compression region. In step 614, prediction processing is performed on subsequent video frames after the first video frame in the plurality of video frames, respectively, with the determined preferred prediction parameter mode set, so as to obtain coding blocks corresponding to each compression unit included in the subsequent video frames. In step 616, entropy coding processing is performed on the coding blocks respectively to obtain the compressed video data.

In some embodiments, the usage of the plurality of prediction modes during the prediction processing of the compression region includes a statistical result of the optimum prediction mode, the optimum prediction mode being determined from the plurality of prediction modes during the prediction processing performed on the at least a part of the compression units included in the compression region.

In some embodiments, the optimum prediction mode is a prediction mode that results in a highest compression ratio of a compression unit.

In some embodiments, step 612 includes: selecting, from the prediction mode parameter set, a prediction mode, whose frequency of being determined as the optimum prediction mode exceeds a predetermined threshold or whose proportion of being determined as the optimum prediction mode exceeds a predetermined percentage, as the preferred prediction mode parameter set of the compression region.

In some embodiments, step 614 includes: performing prediction processing, with the preferred prediction mode parameter set of a compression region at a certain position in the first video frame, on a compression unit in a compression region at a corresponding position in subsequent video frames.

In some embodiments, step 614 further includes: for a compression unit included in each compression region of the subsequent video frames, selecting an optimum prediction mode from the corresponding preferred prediction mode parameter set, so as to perform prediction processing on at least a part of pixels in the pixel array of each compression unit in the compression region.

In some embodiments, during the prediction processing of each compression unit, the compression unit is scanned to obtain each pixel in the pixel array of the compression unit, and the direction of the scanning corresponds to the larger one of a column number and a row number of the pixel array.

In some embodiments, step 614 further includes: the subsequent video frames after the first video frame and the first video frame belong to a same video sequence.

In some embodiments, step 616 further includes: providing an entropy coding mode parameter set including a plurality of entropy coding modes; performing entropy coding processing on coding blocks corresponding to at least a part of the compression units included in the first video frame, respectively, by using the plurality of entropy coding modes in the entropy coding mode parameter set, so as to determine an optimum entropy coding mode corresponding to each coding block; and performing entropy coding processing on coding blocks corresponding to compression units included in subsequent video frames after the first video frame in the plurality of video frames, respectively, by using the optimum entropy coding mode, so as to obtain the compressed video data.

In some embodiments, step 616 further includes: processing each compression region of the first video frame in the plurality of video frames by: E1) providing an entropy coding mode parameter set including a plurality of entropy coding modes; E2) performing entropy coding processing on coding blocks corresponding to at least a part of the compression units included in the compression region, by using the plurality of entropy coding modes included in the entropy coding mode parameter set, and determining usage of the plurality of entropy coding modes during the entropy coding processing of the compression region; and E3) selecting at least a part of the entropy coding modes from the entropy coding mode parameter set as a preferred entropy coding mode parameter set, based on the usage of the plurality of entropy coding modes during the entropy coding processing of the compression region; and selecting an optimum entropy coding mode from the preferred entropy coding mode parameter set to perform entropy coding processing for each coding block corresponding to a compression unit included in video frames after the first video frame in the plurality of video frames, so as to obtain the compressed video data.

In some embodiments, the usage of the plurality of entropy coding modes during the entropy coding processing of the compression region includes: a statistical result of the optimum entropy coding mode, the optimum entropy coding mode being determined from the plurality of entropy coding modes during the entropy coding processing performed on the coding blocks corresponding to the at least a part of the compression units of the compression region.

It should be noted that although several steps of the method for lossless compression of video data and several modules or sub-modules for lossless compression of video data are mentioned in the above detailed description, this division is merely exemplary rather than mandatory. In fact, according to the embodiments of the present application, features and functions of two or more modules described above may be embodied in one module. Conversely, features and functions of one module described above can be further divided into a plurality of modules.

Those skilled in the art will be able to understand and implement other variations to the disclosed embodiments by studying the specification, the disclosure, the drawings and the appended claims. In the claims, the words "include" or "including" do not exclude other elements and steps, and the words "a" or "an" do not exclude the plural. In the practical application of the present application, one part may perform the functions of a plurality of technical features cited in the claims. Any reference numerals in the claims should not be construed as limiting the scope.

What is claimed is:

1. A method for lossless compression of video data, comprising:
   A) receiving video data comprising a plurality of video frames;
   B) dividing each of the plurality of video frames into a plurality of compression regions, wherein each compression region comprises at least one compression unit, and each compression unit comprises a pixel array;
   C) processing each compression region of a first video frame in the plurality of video frames by:
      C1) providing a prediction mode parameter set including a plurality of prediction modes;
      C2) performing prediction processing on at least a part of the compression units included in the compression region using the plurality of prediction modes included in the prediction mode parameter set, and determining usage of the plurality of prediction modes during the prediction processing of the compression region; and
      C3) selecting at least a part of the prediction modes from the prediction mode parameter set as a preferred prediction mode parameter set of the compression region, based on the usage of the plurality of prediction modes during the prediction processing of the compression region;
   D) performing prediction processing on subsequent video frames after the first video frame in the plurality of video frames using the determined preferred prediction parameter mode set, so as to obtain coding blocks corresponding to each compression unit included in the subsequent video frames; and
   E) performing entropy coding processing on the coding blocks, so as to obtain compressed video data.

2. The method of claim 1, wherein the usage of the plurality of prediction modes during the prediction processing of the compression region comprises:
   a statistical result of the optimum prediction mode, the optimum prediction mode being determined from the plurality of prediction modes during the prediction processing performed on the at least a part of the compression units included in the compression region.

3. The method of claim 2, wherein the optimum prediction mode is a prediction mode that results in a highest compression ratio of a compression unit.

4. The method of claim 2, wherein the step C3 comprises:
   selecting, from the prediction mode parameter set, a prediction mode, whose frequency of being determined as the optimum prediction mode exceeds a predetermined threshold or whose proportion of being determined as the optimum prediction mode exceeds a predetermined percentage, as the preferred prediction mode parameter set of the compression region.

5. The method of claim 2, wherein the step D comprises:
   performing prediction processing, with the preferred prediction mode parameter set of a compression region at a certain position in the first video frame, on a compression unit in a compression region at a corresponding position in subsequent video frames.

6. The method of claim 5, wherein the step D further comprises:
   for a compression unit included in each compression region of the subsequent video frames, selecting an optimum prediction mode from the corresponding preferred prediction mode parameter set, so as to perform prediction processing on at least a part of pixels in the pixel array of each compression unit in the compression region.

7. The method of claim 1, wherein, during the prediction processing of each compression unit, the compression unit is scanned to obtain each pixel in the pixel array of the compression unit, and the direction of the scanning corresponds to the larger one of a column number and a row number of the pixel array.

8. The method of claim 1, wherein the subsequent video frames after the first video frame and the first video frame belong to a same video sequence.

9. The method of claim 1, wherein the step E further comprises:
providing an entropy coding mode parameter set including a plurality of entropy coding modes;
performing entropy coding processing on coding blocks corresponding to at least a part of the compression units included in the first video frame, respectively, by using the plurality of entropy coding modes in the entropy coding mode parameter set, so as to determine an optimum entropy coding mode corresponding to each coding block; and
performing entropy coding processing on coding blocks corresponding to compression units included in subsequent video frames after the first video frame in the plurality of video frames, respectively, by using the optimum entropy coding mode, so as to obtain the compressed video data.

10. The method of claim 1, wherein the step E further comprises:
processing each compression region of the first video frame in the plurality of video frames by:
E1) providing an entropy coding mode parameter set including a plurality of entropy coding modes;
E2) performing entropy coding processing on coding blocks corresponding to at least a part of the compression units included in the compression region, by using the plurality of entropy coding modes included in the entropy coding mode parameter set, and determining usage of the plurality of entropy coding modes during the entropy coding processing of the compression region; and
E3) selecting at least a part of the entropy coding modes from the entropy coding mode parameter set as a preferred entropy coding mode parameter set, based on the usage of the plurality of entropy coding modes during the entropy coding processing of the compression region; and
selecting an optimum entropy coding mode from the preferred entropy coding mode parameter set to perform entropy coding processing for each coding block corresponding to a compression unit included in video frames after the first video frame in the plurality of video frames, so as to obtain the compressed video data.

11. The method of claim 10, wherein the usage of the plurality of entropy coding modes during the entropy coding processing of the compression region comprises:
a statistical result of the optimum entropy coding mode, the optimum entropy coding mode being determined from the plurality of entropy coding modes during the entropy coding processing performed on the coding blocks corresponding to the at least a part of the compression units of the compression region.

12. A device for lossless compression of video data, the device being used for compressing video data including a plurality of video frames, wherein each of the plurality of video frames is divided into a plurality of compression regions, each compression region comprises at least one compression unit, and each compression unit comprises a pixel array, the device comprising:
a compression mode parameter set configured to provide a prediction mode parameter set, wherein the prediction mode parameter set comprises a plurality of prediction modes for performing two-dimensional spatial prediction processing on the video data;
a two-dimensional spatial prediction module configured to perform the two-dimensional spatial prediction processing on at least a part of the compression units included in each compression region of the first video frame of the plurality of video frames using the plurality of prediction modes included in the prediction mode parameter set, and generate corresponding coding blocks;
a compression cost computation module configured to receive, from the two-dimensional spatial prediction module, the prediction mode used for prediction processing of each compression unit of the first video frame and the corresponding coding blocks, and determine an optimum prediction mode of each compression unit;
a statistics module configured to receive, from the compression cost computation module, the optimum prediction mode used for prediction processing of the compression units included in the first video frame, and generate a statistical result of the optimum prediction mode;
an adaptive mode parameter set selection module configured to select at least a part of the prediction modes from the prediction mode parameter set as a preferred prediction mode parameter set of each compression region based on the statistical result of the optimum prediction mode, and analyze whether the preferred prediction mode parameter set is applicable to prediction processing of subsequent video frames in the current video sequence after the preferred prediction mode parameter set has been selected;
wherein the two-dimensional spatial prediction module is further configured to perform the two-dimensional prediction processing on the subsequent video frames after the first video frame in the plurality of video frames using the selected preferred prediction mode parameter set, so as to obtain coding blocks corresponding to each compression unit included in the subsequent video frames; and
wherein the device further comprises an entropy coding module configured to perform entropy coding processing on the coding blocks, so as to obtain compressed video data.

13. The device of claim 12, wherein the optimum prediction mode is a prediction mode that results in a highest compression ratio of a compression unit.

14. The device of claim 13, wherein the adaptive mode parameter set selection module is further configured to:
select, from the prediction mode parameter set, a prediction mode, whose frequency of being determined as the optimum prediction mode and exceeds a predetermined threshold or whose proportion of being determined as the optimum prediction mode exceeds a predetermined percentage, as the preferred prediction mode parameter set of the compression region.

15. The method of claim 12, wherein the two-dimensional spatial prediction module is further configured to:
perform prediction processing, with the preferred prediction mode parameter set of a compression region at a certain position in the first video frame, on a compression unit in a compression region at a corresponding position in subsequent video frames.

16. The device of claim 15, wherein the two-dimensional spatial prediction module is further configured to:

for a compression unit included in each compression region of the subsequent video frames, select an optimum prediction mode from the corresponding preferred prediction mode parameter set, so as to perform prediction processing on at least a part of pixels in the pixel array of each compression unit in the compression region.

17. The device of claim 12, wherein, during the prediction processing of each compression region, the compression unit obtains each pixel in the pixel array of the compression region in a specific scanning order, and a direction of the scanning corresponds to the larger one of a column number and a row number of the pixel array.

18. The device of claim 12, wherein the subsequent video frames after the first video frame and the first video frame belong to a same video sequence.

19. A device for lossless compression of video data, the device being used for performing compression processing on video data including a plurality of video frames, wherein each of the plurality of video frames is divided into a plurality of frame regions, each compression region comprises at least one compression unit, and each compression unit comprises a pixel array; the device comprising:

a compression mode parameter set configured to provide a prediction mode parameter set and an entropy coding mode parameter set, the prediction mode parameter set including a plurality of prediction modes for performing two-dimensional spatial prediction processing on the video data, and the entropy coding mode parameter set including a plurality of entropy coding modes for performing entropy coding processing on the video data;

a two-dimensional spatial prediction module configured to perform the two-dimensional spatial prediction processing on at least a part of the compression units included in each compression region of the first video frame of the plurality of video frames using the plurality of prediction modes included in the prediction mode parameter set, and generate corresponding coding blocks;

a compression cost computation module configured to receive, from the two-dimensional spatial prediction module, the prediction mode used for prediction processing of at least a part of the compression units of the first video frame and the corresponding coding blocks, and perform entropy coding preprocessing on the coding blocks using the plurality of entropy coding modes included in the entropy coding mode parameter set, so as to determine an optimum prediction mode, an optimum entropy coding mode, an optimum codeword length and optimum coding blocks of each compression unit;

a statistics module configured to receive, from the compression cost calculation module, the optimum prediction mode, the optimum entropy coding mode and the optimum coding blocks used for compressing the compression units included in the first video frame, and generate a statistical result of the optimum prediction mode and the optimum entropy coding mode;

an adaptive mode selection module configured to select at least a part of the prediction modes from the prediction mode parameter set as a preferred prediction mode parameter set of each compression region based on the statistical result of the optimum prediction mode, select at least a part of the entropy coding modes from the entropy coding mode parameter set as a preferred entropy coding mode parameter set of each compression region based on the statistical result of the optimum entropy coding mode and the optimum coding blocks, and analyze whether the preferred prediction mode parameter set and the preferred entropy coding mode parameter set are applicable to prediction processing of subsequent video frames in the current video sequence after the preferred prediction mode parameter set has been selected;

wherein the two-dimensional spatial prediction module is further configured to perform the two-dimensional prediction processing on the subsequent video frames after the first video frame in the plurality of video frames using the selected preferred prediction mode parameter set, so as to obtain coding blocks corresponding to each compression unit included in the subsequent video frames; and wherein the device further comprises an entropy coding module configured to perform entropy coding processing on the coding blocks corresponding to each compression unit included in the subsequent video frames using the selected preferred entropy coding mode parameter set, so as to obtain compressed video data.

20. The device of claim 19, wherein the entropy coding module is further configured to:

perform entropy coding processing, with the preferred entropy coding mode parameter set of a compression unit at a certain position of the first video frame, on coding blocks corresponding to a compression unit in a compression region at a corresponding position in the subsequent video frames.

21. The device of claim 19, wherein the subsequent video frames after the first video frame and the first video frame belong to a same video sequence.

* * * * *